United States Patent [19]
Yamahara

[11] Patent Number: 5,512,336
[45] Date of Patent: Apr. 30, 1996

[54] LIQUID CRYSTAL DISPLAY DEVICE

[75] Inventor: Motohiro Yamahara, Osaka, Japan

[73] Assignee: Sharp Kabushiki Kaisha, Osaka, Japan

[21] Appl. No.: 344,709

[22] Filed: Nov. 18, 1994

[30] Foreign Application Priority Data

Nov. 25, 1993 [JP] Japan .................................. 5-295676

[51] Int. Cl.⁶ .................................................. G02F 1/133
[52] U.S. Cl. .................................. 428/1; 359/74; 359/75; 359/102
[58] Field of Search ............................. 428/1; 359/74.75, 359/102

[56] References Cited

U.S. PATENT DOCUMENTS

| | | | |
|---|---|---|---|
| 4,615,919 | 10/1986 | Inoue et al. | 428/1 |
| 4,838,658 | 6/1989 | Zondler | 359/75 |
| 5,093,739 | 3/1992 | Aida | 359/73 |

FOREIGN PATENT DOCUMENTS

| | | |
|---|---|---|
| 0217641 | 4/1987 | European Pat. Off. . |
| 0264808 | 4/1988 | European Pat. Off. . |
| 0337355 | 10/1989 | European Pat. Off. . |
| 0506175 | 9/1992 | European Pat. Off. . |
| 57-186735 | 11/1982 | Japan . |
| 3-14162 | 2/1991 | Japan . |
| 3-293324 | 12/1991 | Japan . |
| 4-221935 | 8/1992 | Japan . |
| 5-323327 | 12/1993 | Japan . |

OTHER PUBLICATIONS

European Search Report May 1995.

*Primary Examiner*—Nasser Ahmad
*Attorney, Agent, or Firm*—Nixon & Vanderhye

[57] ABSTRACT

A liquid crystal display device according to the present invention includes: a pair of substrates opposing each other, a plurality of display device pixels being provided in a matrix shape on each of the pair of substrates; a liquid crystal layer interposed between the pair of substrates; and an orientation layer for controlling an orientation state of liquid crystal molecules in the liquid crystal layer, the orientation layer being formed on a surface of at least one of the substrates that opposes the liquid crystal layer. The orientation layer is composed essentially of a polymer alloy. Since the polymer alloy in the orientation layer has a phase separation structure, it becomes possible to obtain regularly-formed portions of liquid crystal, liquid crystal molecules in the portions being aligned either radially, bi-axially, or multi-axially, and it also becomes possible to control the sizes of such portions. As a result, such problems as contrast changes, coloration phenomena, and reversal phenomena of displayed images, which would occur due to the viewing angle dependence of the contrast with respect to the vertical and horizontal directions, are eliminated, thereby achieving high contrast and substantially no display unevenness.

14 Claims, 7 Drawing Sheets

LIQUID CRYSTAL DISPLAY DEVICE

BACKGROUND OF THE INVENTION

1. Field of the Invention

The present invention relates to a liquid crystal display device, and in particular to a liquid crystal display device having excellent viewing angle characteristics.

2. Description of the Related Art

Liquid crystal display devices incorporating nematic liquid crystal display devices, in which a nematic liquid crystal is interposed between a pair of substrates, have conventionally been generally used for numeral segment type display devices such as clocks and calculators. Active switching elements such as TFTs (Thin Film Transistors) are formed on a light transmitting substrate so as to function as a switching means for selectively driving pixel electrodes for applying a driving voltage to the liquid crystal. On a counter substrate provided so as to oppose the light transmitting substrate, a plurality of minute color filter layers having colored regions of red, green, and blue are provided as passive elements of a color display means.

Examples of such liquid crystal display devices, as categorized based on the twist angle of the liquid crystal, are: (a) active type, twisted nematic (hereinafter referred to as "TN") liquid crystal display system in which nematic liquid crystal molecules are aligned so as to be twisted by 90°; and (b) multiplex type, super twisted nematic (hereinafter referred to as "STN") liquid crystal display system in which nematic liquid crystal molecules having a twist angle of 90° or more are used so as to attain steep voltage-light transmittance characteristics, (the voltage being applied to the liquid crystal).

In general, the active type TN liquid crystal display system is further categorized into: (a-i) a normally black system where a pair of polarizing plates are disposed in such a manner that the polarizing directions thereof are parallel to each other, so that a black image is displayed when no voltage is applied to the liquid crystal layer (i.e., in an OFF state); and (a-ii) a normally white system where a pair of polarizing plates are disposed in such a manner that the polarizing directions thereof are perpendicular to each other, so that a white image is displayed in an OFF state. Among the two systems, the (a-ii) normally white system is considered to be more promising in terms of color reproductivity and viewing angle dependence of display.

Figure 7A:
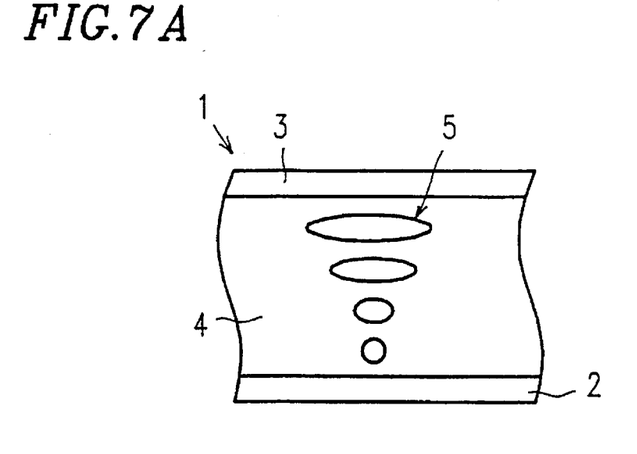
FIG. 7A is a cross-sectional view for describing problems of a conventional liquid crystal display device.
Figure 7B:
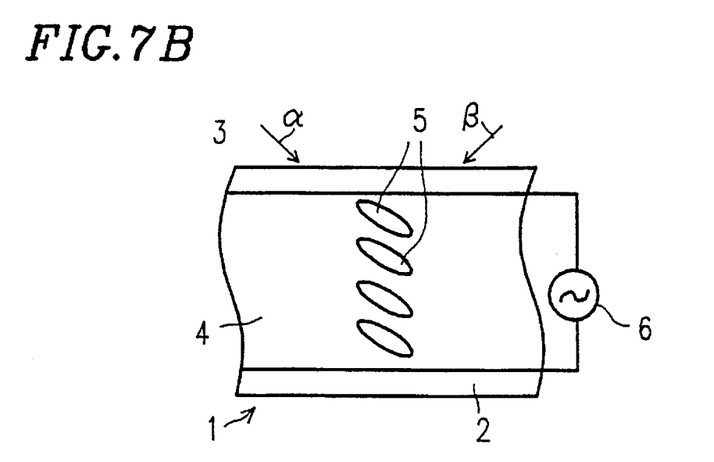
FIG. 7B is a cross-sectional view for describing problems of a conventional liquid crystal display device.
Figure 7C:
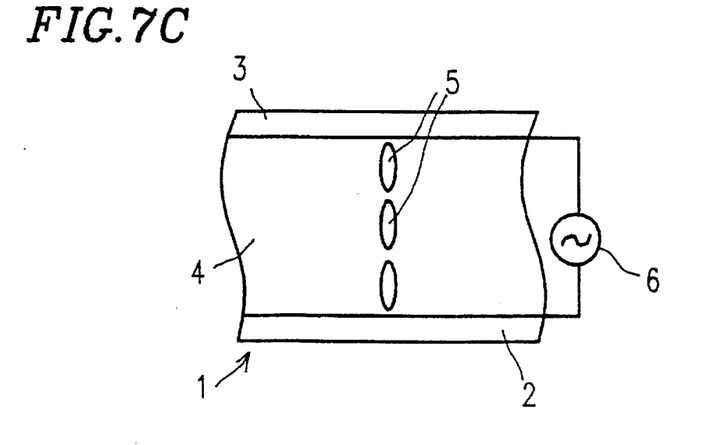
FIG. 7C is a cross-sectional view for describing problems of a conventional liquid crystal display device.

FIGS. 7A to 7C each show a cross section of a conventional TN type liquid crystal display device 1. The problems associated with a conventional TN type liquid crystal display device will be described with reference to FIGS. 7A to 7C.

The display device 1 includes a pair of glass substrates 2 and 3 and a liquid crystal layer 4 interposed between the glass substrates 2 and 3. As shown in FIG. 7A, liquid crystal molecules 5 that constitute the liquid crystal layer 4 are aligned in such a manner that the longitudinal axes thereof are twisted by 90° between the substrates 2 and 3.

In the conventional TN type liquid crystal display device 1 of the above configuration, if a voltage is applied to the liquid crystal layer 4 with the use of a driving circuit 6 while light is incident on the liquid crystal display device 1, so that an electric field in the vicinity of the liquid crystal layer 4 is turned on and off, the liquid crystal molecules 5 stand uniformly in the same direction when a voltage is applied to the liquid crystal layer 4 as shown in FIGS. 7B to 7C. As a result, the liquid crystal display device 1 has limited viewing angle characteristics.

In the TN type liquid crystal display device 1 shown in FIGS. 7A to 7C, liquid crystal molecules, which originally have refractive index anisotropy, are aligned at a certain angle with respect to the pair of substrates 2 and 3, on whose surface electrodes are formed, so that the contrast of a displayed image depends on a viewing angle at which a viewer observes the liquid crystal display device. In other words, the TN type liquid crystal display device 1 has a large viewing angle dependence. In particular, as the viewing angle becomes large with respect to a normal axis direction to the display, toward a direction where the display contrast improves, the black and white regions of the image suddenly reverse at a point when the viewing angle exceeds a certain value. This is well known as a "reverse phenomenon".

In order to improve the viewing angle dependence, attempts have been made to compensate for the phase difference between an ordinary light component and an extraordinary light component by incorporating a film-like phase difference plate between the substrates and the polarizing plates, the phase difference plate being such that one of the directions of the principal refractive indices of index ellipsoids, e.g., a polymer, is parallel to the normal axis of the display. However, the above-mentioned reverse phenomenon can only be improved to a certain extent, even by using such a phase difference plate.

Other methods that have been proposed for improving the viewing angle dependence of a TN type liquid crystal display device are: a pixel dividing method (disclosed in Japanese Laid-Open Patent Publication No. 57-186735), a rubbing angle optimization method (disclosed in Japanese Laid-Open Patent Publication No. 4-221935), and a non-rubbing method (Japanese Patent Publication No. 3-14162). However, each of the above methods has inherent problems.

The pixel dividing method, for example, can eliminate the reverse phenomenon and viewing angle dependence along the vertical direction. However, this method has problems in that: the display contrast lowers; a black image appears grey when the viewing angle is tilted from the normal axis direction, i.e., a discoloration problem; and the liquid crystal display device has viewing angle dependence along a horizontal direction (i.e., from left to right) and/or a vertical direction (i.e., from top to bottom). The rubbing angle optimization method, although capable of improving the reverse phenomenon between white and black images, has problems in that a displayed image can appear properly in only a small range of viewing angles in a direction opposite to a direction along which a reverse phenomenon may occur, and that the display contrast when the liquid crystal display device is viewed at the normal axis direction decreases. The non-rubbing method has a problem in that disclination lines remain conspicuous.

Still another method for improving the viewing angle dependence is a method using an LB film produced by the Langmuir-Blodgett's technique, disclosed in Japanese Laid-Open Patent Publication No. 3-293324. According to this method, molecular chains (main chains) of the LB film are generally uniformly aligned along a predetermined direction so that liquid crystal molecules are aligned along the direction of the molecular chains of the LB film. For an LB film, a stereoregular polymer is preferably used. A stereoregular polymer is a polymer having regularity with respect to its three-dimensional structure on the atomic level. Accordingly, a liquid crystal display device incorporating an LB film has viewing dependence such that the contrast of the liquid crystal display device varies depending on the viewing angle along vertical and horizontal directions at which the liquid crystal display device is observed. Therefore, this method has a problem in that the abovementioned image displaying defects may occur, thereby degrading the quality of the displayed image.

In general, the above-mentioned (b) multiplex type STN liquid crystal display system is further categorized, depending on the kind of optical phase difference elements used for the liquid crystal display device in order to ensure proper display of white and black images, into: (b-i) a two-layer type, double super twisted nematic (hereinafter referred to as "DSTN") incorporating a multistructure including a liquid crystal display device for a display purpose and a liquid crystal display device for an optical compensation purpose in which liquid crystal molecules are aligned in a twisted manner at a twist angle in the opposite direction of a twist angle of the liquid crystal display device for a display purpose; and (b-ii) a film-equipped type, liquid crystal display system, according to which a film having optical anisotropy is attached to a liquid crystal display device. Among the two systems, the (b-ii) film-equipped type liquid crystal display device system is considered to be more promising in terms of reduction of the mass and production cost of the liquid crystal display device. However, either of the liquid crystal display systems of (b-i) and (b-ii) has a problem of a characteristic coloration phenomenon of the STN liquid crystal.

SUMMARY OF THE INVENTION

A liquid crystal display device according to the present invention includes: a pair of substrates opposing each other, a plurality of display pixel electrodes being provided in a matrix shape on one of the pair of substrates; a liquid crystal layer interposed between the pair of substrates; and an orientation layer for controlling an orientation state of liquid crystal molecules in the liquid crystal layer, the orientation layer being formed on a surface of at least one of the substrates that opposes the liquid crystal layer, wherein the orientation layer is composed essentially of a polymer alloy.

In one embodiment of the invention, the polymer alloy has a phase separation structure, and a portion in which the liquid crystal molecules are controlled so as to have at least one orientation state of a linear orientation, a radial orientation, a bi-axial orientation, and a multi-axial orientation is formed corresponding to each of the plurality of display device pixels.

In another embodiment of the invention, the orientation layer is an organic film having a macro-phase separation structure obtained by using an incompatible polymer blend.

In still another embodiment of the invention, the orientation layer is an organic film having a micro-phase separation structure obtained by using a block copolymer including an incompatible block chain.

In still another embodiment of the invention, the orientation layer is an organic film having a micro-phase separation structure obtained by using a graft copolymer grafted with an incompatible monomer.

In still another embodiment of the invention, the orientation layer is an organic film having a micro-phase separation structure obtained by using an interpenetrating polymer network including a polymer pair of an incompatible type.

In still another embodiment of the invention, the phase separation structure has a size in the range of 10 nm to 200 µm.

In still another embodiment of the invention, the macro-phase separation structure has a size in the range of 500 nm to 200 µm.

In still another embodiment of the invention, the micro-phase separation structure has a size in the range of 10 nm to 1 µm.

In still another embodiment of the invention, the polymer alloy is selected from the group consisting of: a polyamide (PA) type alloy; a polyimide (PI) type alloy; a polyolefin (PO) type alloy; a polystyrene (PS) type alloy; a polyethyleneterephthalate (PET) type alloy; a polyvinyl chloride (PVC) type alloy; a polymethyl methacrylate (PMMA) type alloy; a polyacetal type alloy; a polycarbonate (PC) type alloy; a polyphenylene ether (PPE) type alloy; a polyphenylene sulfide (PPS) type alloy; a polyarylene etherketone (PAEK) type alloy; and an amorphous polyarlylate (PAr) type alloy.

In still another embodiment of the invention, the liquid crystal layer includes a nematic liquid crystal material including no chiral dopant.

In still another embodiment of the invention, the liquid crystal layer includes a nematic liquid crystal to which a chiral dopant is added.

In still another embodiment of the invention, the liquid crystal layer includes a dichroic dye.

In still another embodiment of the invention, active switching elements are formed on one of the pair of substrates, the switching elements being actively driven.

Thus, the invention described herein makes possible at least one of the advantages of: (1) providing a liquid crystal display device in which the change in contrast of a displayed image depending on the viewing angle, the coloration phenomenon, and the reverse phenomenon of the displayed image can be solved; (2) providing a liquid crystal display device capable of highly uniform display and high contrast; (3) providing a liquid crystal display device having a remarkably improved display quality; and (4) forming portions of liquid crystal in which the liquid crystal molecules are aligned radially, bi-axially, or multi-axially so as to have a regularity, and controlling the size of such portions.

These and other advantages of the present invention will become apparent to those skilled in the art upon reading and understanding the following detailed description with reference to the accompanying figures.

DESCRIPTION OF THE PREFERRED EMBODIMENTS

In a liquid crystal display device of the present invention, an organic film for controlling the orientation state of the liquid crystal molecules of a liquid crystal layer thereof is used which is composed essentially of a polymer alloy. The polymer alloy is of a multi-component polymer system, and is capable of forming a macroscopic phase separation structure (macro-phase separation structure) or a microscopic phase separation structure (micro-phase separation structure). The polymer alloy can control the orientation state of the liquid crystal molecules because of the phase separation structure. Examples of polymer alloys to be suitably used for the above-mentioned orientation film include: PA type alloys and PI type alloys, such as polyamide (PA)/polyimide (PI), PA/elastomer, and PI/PI; PO type alloys and PS type alloys, such as nylon/commodity polyolefin (PO), PO/PO, and PO/polystyrene (PS); PET type alloys such as polyethyleneterephthalate (PET)/polybutyleneterephthalate (PBT); polyvinyl chloride (PVC) type alloys; polymethyl methacrylate (PMMA) type alloys; polyacetal type alloys; polycarbonate (PC) type alloys; polyphenylene ether (PPE) type alloys; polyphenylene sulfide (PPS) type alloys; polyarylene etherketone (PAEK) type alloys; and amorphous polyarlylate (PAr) type alloys. Alloys such as polyethylene (PE)/nylon, polypropylene (PP)/nylon, PS/PP, PS/polyisoprene copolymer, PS/tetrahydrofuran block copolymer, and PMMA/PE may be used.

Methods for forming the above-mentioned polymer alloy can be categorized into a physical method and a chemical method. In general, the macro-phase separation structure can be obtained by a physical method, whereas the micro-phase separation structure can be obtained by a chemical method. A typical example of the physical method is a polymer blend method. Typical examples of chemical methods include block copolymerization, graft copolymerization, and an interpenetrating polymer network (IPN) method.

The polymer blend method is a method in which different polymer components are mixed and dispersed by a physical process. According to the present invention, either known melt-kneading methods or solvent cast methods can be used for mixing and dispersion. Melt-kneading is a method in which polymers which have been melted in an extruder, maintained at a high temperature, are mixed by means of the rotation of a screw. The polymers thus mixed are extruded as a molding in the form of a film, pellets, and the like, depending on the purpose thereof. In the present invention, the polymer are extruded in the form of a film. If necessary, the polymer mixture thus formed in a film shape is subjected to an orientation treatment so as to have an orientation along at least one axis. In accordance with the melt-kneading method, it is possible to control the macro-phase separation structure by varying the melt-kneading temperature, the shear stress during the melt-kneading (i.e., the rotation frequency of the screw), orientation conditions, and the like. A PS/polyisoprene alloy, which can be suitably used as an organic film for the liquid crystal display device according to the present invention, is preferably formed by a solvent cast method. A solvent cast method is a method in which different polymer components are dissolved in a solvent, and then the solvent is casted at a predetermined temperature so as to form a film. In accordance with the solvent cast method, it is also possible to control the macro-phase separation structure by varying the casting temperature, the kind of solvent, and the like. The above-mentioned PS/polyisoprene alloy can be suitably formed by casting at about 200° C. for about 90 minutes. In either method, the film-formation conditions may vary depending on the kinds of polymers and the desired orientation state of the liquid crystal.

Examples of macro-phase separation structures that can be obtained by the polymer blend method include a sea-and-island structure, a continuous phase structure, a complex dispersed phase structure, and a modified structure. A macro-phase separation structure has a size on the order of μm (micrometers), which is considerably larger than the sizes of polymer molecules, which are on the order of nm (nanometers). Accordingly, a macro-phase separation structure is capable of creating an orientation state of liquid crystal different from that created by a micro-phase separation structure. Furthermore, different macro-phase separation structures can create different orientation states of the liquid crystal. The size of the macro-phase separation structure to be used, according to the present invention, is in the range of 500 nm to 200 μm, and preferably in the range of 500 nm to 10 μm, and most preferably in the range of 1 μm to 7 μm.

The above-mentioned graft copolymerization and block copolymerization can be performed in accordance with known graft copolymerization methods and block copolymerization methods, respectively. The resultant polymer is formed into a film by the above-mentioned melt-kneading method or solvent cast method so as to form a micro-phase separation structure. A PS/polyisoprene block copolymer alloy, which can be suitably used as an organic film for the liquid crystal display device according to the present invention, is preferably polymerized by living polymerization. A micro-phase separation structure has a size on the order of nm (nanometers), which is the size of polymer molecules. The size of the micro-phase separation structure to be used according to the present invention is in the range of 10 nm to 1 μm, and preferably in the range of 100 nm to 1 μm, and most preferably in the range of 200 nm to 1 μm. A micro-phase separation structure is a periodic structure which is also referred to as a microdomain structure. Examples of microdomain structures include: a spherical structure in which domains of one polymer component of spherical shapes are dispersed in a domain of another polymer component so as to form a regular sequence; a rod-like structure in which domains of one polymer component of rod-like shapes are dispersed in a domain of another polymer component so as to be substantially parallel to one another and so as to form a regular sequence; and a lamella structure in which domains of different polymer components of layer-like shapes are dispersed in a domain of another polymer component so as to be substantially parallel to one another and so as to form a regular sequence. Accordingly, a different micro-phase separation structure can create different orientations of the liquid crystal as do different macro-phase separation structures. It is possible to control the micro-phase separation structure by varying the content ratios of polymers during copolymerization, polymerization conditions and the like, whereby a desired orientation state of the liquid crystal can be obtained.

An IPN can also be formed by a known method. An IPN forms a specific mirco-phase separation structure because the polymer components thereof are entangled with one another. An IPN method can also achieve a desired orientation state of the liquid crystal by varying the kinds of polymers and the conditions for forming the IPN (i.e., polymerization conditions), as does copolymerization.

The domains in the phase separation structure of a polymer alloy thus obtained can have different sizes, shapes, and properties depending on the method used. Moreover, domains of different properties have different surface structure, wettability, attraction properties, $\pi$ electron interactions, and the like, which affect the orientation and the tilt angle of the liquid crystal. By dispersing or aligning such domains in an orientation film with some regularity, it becomes possible to ensure that the polymer alloy has domains in which the liquid crystal molecules have a radial, bi-axial, or multi-axial orientation, and to control the sizes, shapes, and the regularities of such domains.

Moreover, by using an organic film of the present invention, it becomes possible to align liquid crystal molecules without performing a rubbing treatment. The organic film of the present invention can be formed by using a spin coating method, a dipping method, or the like.

Thus, according to the present invention, an organic film composed of a polymer alloy which has a phase separation structure is used for a liquid crystal orientation layer (film) on at least one of a pair of substrates of a liquid crystal display device including a liquid crystal layer between the pair of substrates. As a result, it is possible to align the liquid crystal molecules radially, bi-axially, or multi-axially, and to control the sizes, shapes, and the regularities of such aligned portions of liquid crystal. Thus, the following advantages are attained: (1) providing a liquid crystal display device in which the change in contrast of a displayed image, depending on the viewing angle, the coloration phenomenon, and the reverse phenomenon of the displayed image, can be solved; (2) providing a liquid crystal display device capable of highly uniform display and high contrast; and (3) providing a liquid crystal display device having a remarkably improved display quality. This is because a multitude of portions are created in the liquid crystal where the liquid crystal molecules are aligned radially, bi-axially, or multi-axially, so that polarizing plates provided on the sides of the liquid crystal display device can have any relative positions with respect to each other without allowing the tint of a displayed image to change, as long as transmission axes thereof are either perpendicular or parallel to each other. Thus, there occurs substantially no change in the contrast of the liquid crystal display device depending on the viewing angle.

Hereinafter, the present invention will be described by way of examples with reference to the accompanying drawings.

EXAMPLE 1

Figure 1:
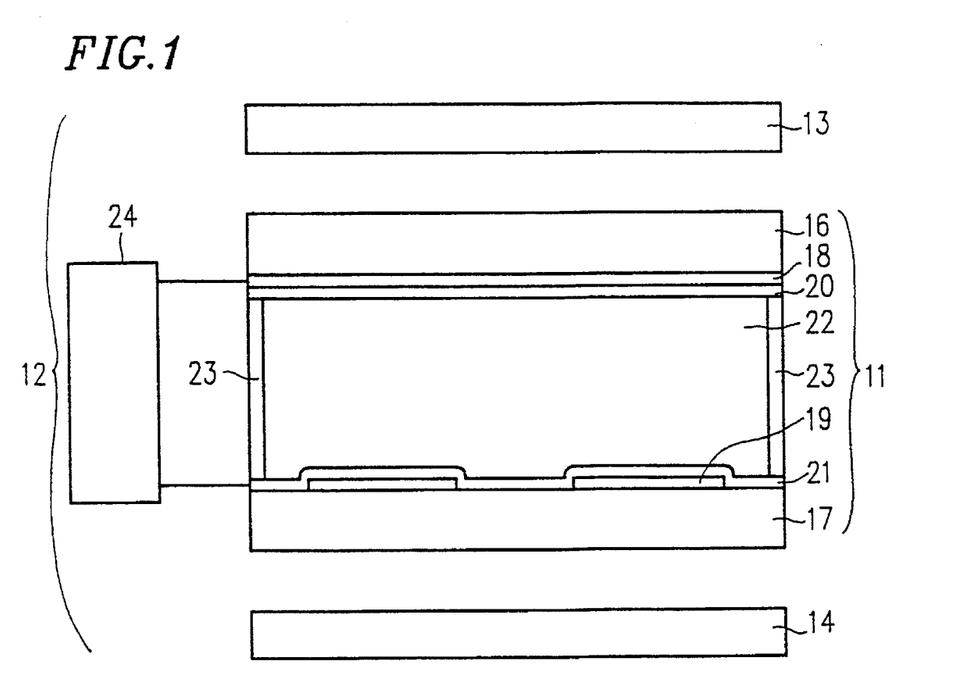
FIG. 1 is a cross-sectional view showing a liquid crystal display apparatus 12 incorporating a liquid crystal display device 11 according to an example of the present invention.

FIG. 1 is a cross-sectional view showing a configuration for a liquid crystal display apparatus 12 according to Example 1 of the present invention. The liquid crystal display apparatus 12 includes a pair of polarizing plates 13 and 14 and a liquid crystal display device 11. In the liquid crystal display device 11, a counter electrode 18 and display pixel electrodes 19 are formed on surfaces of a pair of glass substrates 16 and 17, respectively. The counter electrode 18 and the display pixel electrodes 19 are transparent electrodes composed of ITO (indium tin oxide). On the surface of the glass substrate 16, an orientation film 20 is formed so as to cover the counter electrode 18. On the surface of the glass substrate 17, an orientation film 21 is formed so as to cover the display pixel electrodes 19. The orientation films 20 and 21 may be formed of a PS/polyisoprene block copolymer, for example. No rubbing treatment is conducted for the orientation films 20 and 21.

After sealing a peripheral portion of the pair of glass substrates 16 and 17 with a sealing material 23, liquid crystal is injected in an interspace between the glass substrates 16 and 17 so as to form a liquid crystal layer 22. In this example, a liquid crystal material having a refractive index anisotropy $\Delta n$ of 0.081, to which no chiral dopant has been added, is used for the liquid crystal layer 22. In this example, the thickness of the interspace between the orientation films 20 and 21, i.e., the thickness of the liquid crystal layer 22, is prescribed to be about 5.5 μm by using spacers of a spherical, cylindrical, or fiber-like shape. The liquid crystal display apparatus 12 displays an image when a driving voltage is applied to the counter electrode 18 and the display pixel electrodes 19 on the glass substrates 16 and 17.

Figure 2:
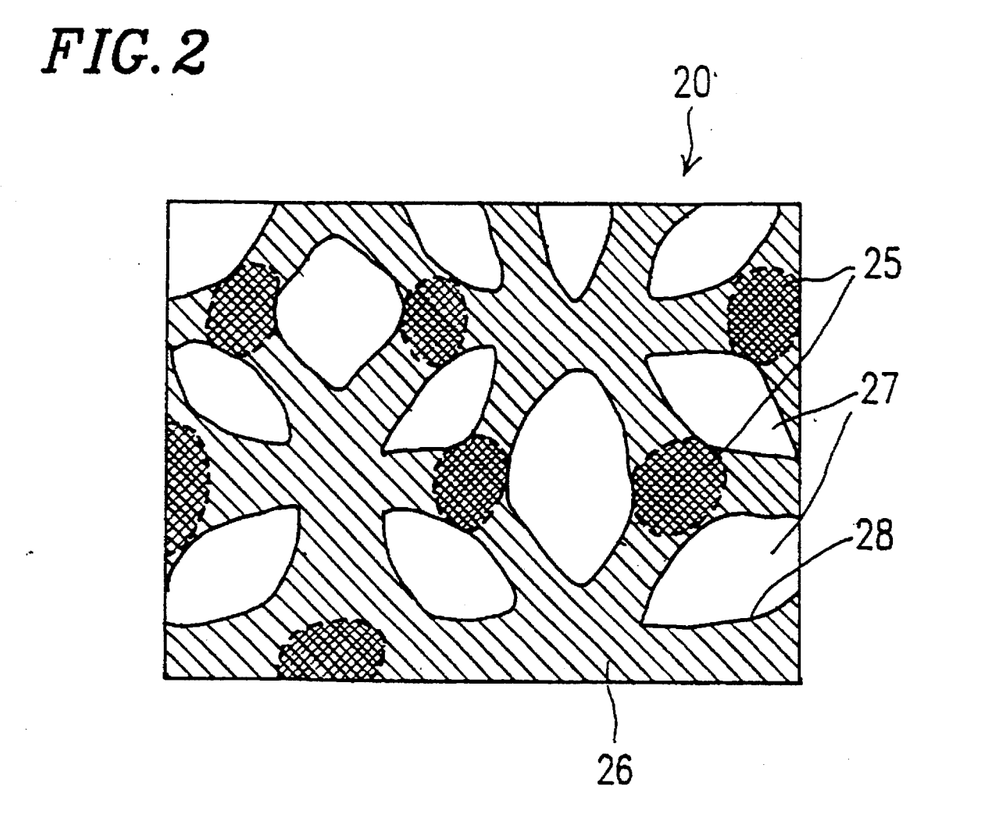
FIG. 2 is a diagram showing a state of phase separation structure of orientation films 20 and 21 on substrates 16 and 17 of a liquid crystal display device 11.

An observation of the orientation films 20 and 21 by means of an electron microscope revealed that, as shown in FIG. 2, a micro-phase separation structure is formed therein. More specifically, polymer cores 25 as constituent units of the orientation films 20 and 21 and polymer binders 26 as constituent units to bind a plurality of polymer cores 25 to one another are formed in the orientation films 20 and 21. Between some polymer cores 25 and polymer binders 26, concave portions 27 are formed. Each concave portion 27 is a concave dent or a through hole.

Over the entire orientation films 20 and 21 of the liquid crystal display apparatus 12, liquid crystal molecules have entered the concave portions 27. It has been confirmed that interfaces 28 of the concave portions 27 control the orientation state of the liquid crystal molecules, thereby creating portions where liquid crystal molecules have a multi-axial orientation.

Figure 3:
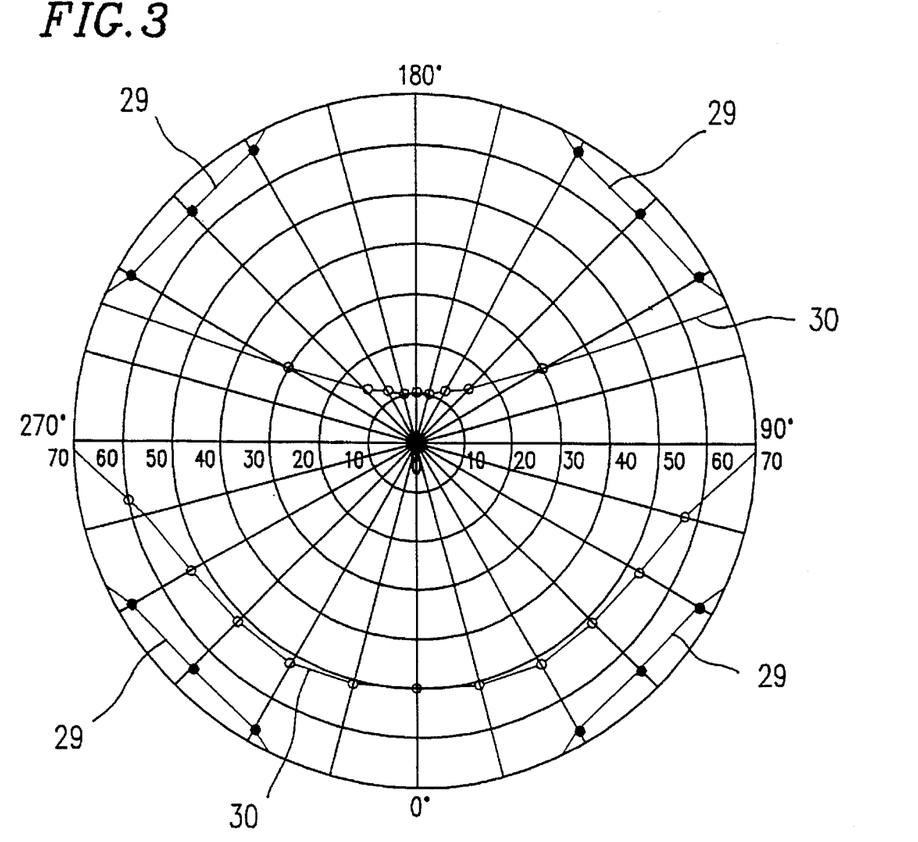
FIG. 3 is a radar chart showing an equi-contrast curve of each of a liquid crystal display device according to Example 1 and a conventional liquid crystal display device.
Figure 4A:
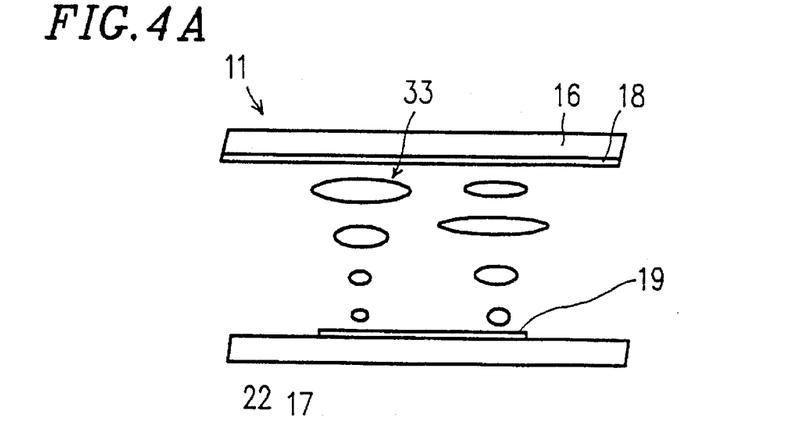
FIG. 4A is a cross-sectional view for describing an operation principle of a liquid crystal display device according to an example of the present invention.
Figure 4B:
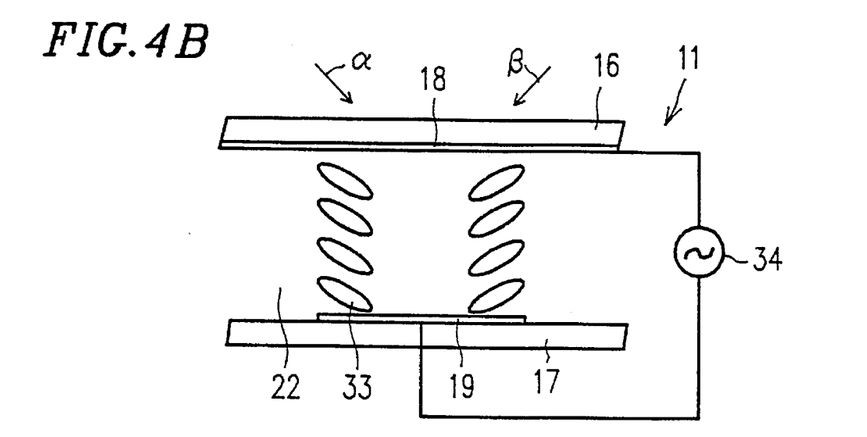
FIG. 4B is a cross-sectional view for describing an operation principle of a liquid crystal display device according to an example of the present invention.
Figure 4C:
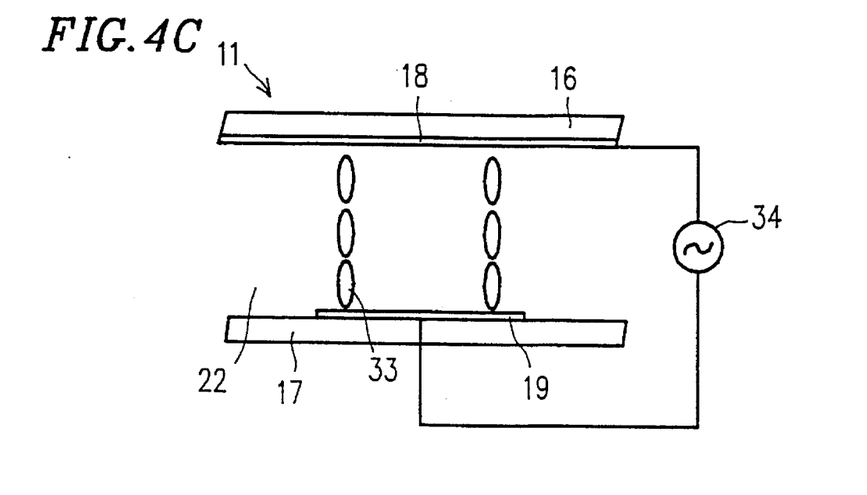
FIG. 4C is a cross-sectional view for describing an operation principle of a liquid crystal display device according to an example of the present invention.
Figure 4D:
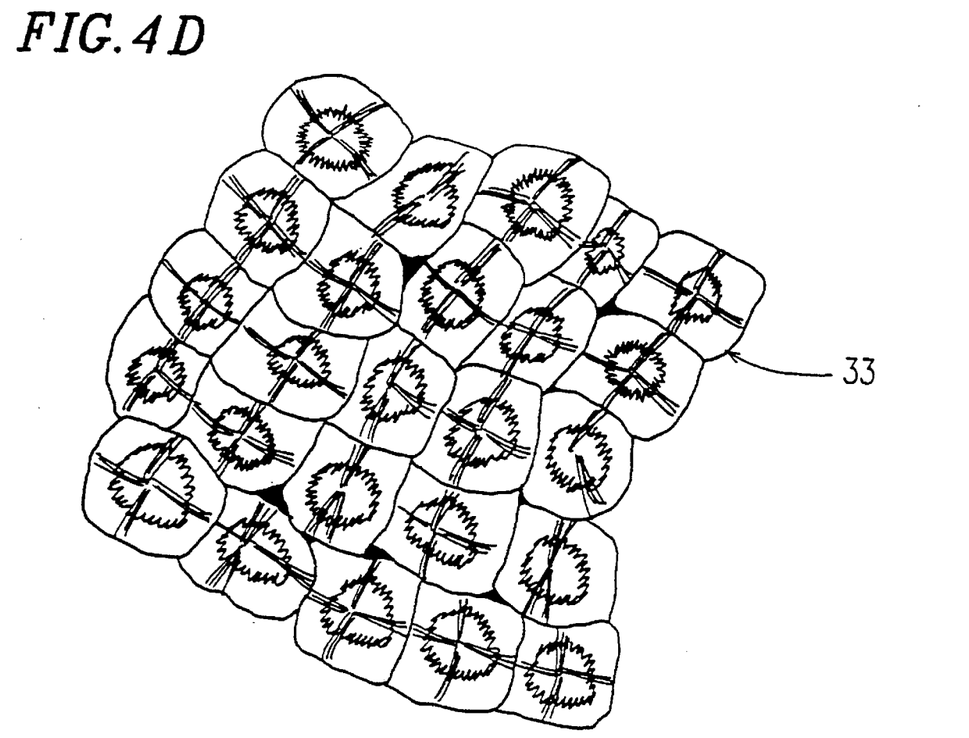
FIG. 4D is a diagram showing a multi-axial orientation state of liquid crystal molecules.

FIG. 3 is a radar chart showing the viewing angle dependence of the contrast of each of the liquid crystal display apparatus 12 of the present example and a conventional TN type liquid crystal display apparatus. In FIG. 3, lines 29 indicate the viewing angle dependence of the contrast of the liquid crystal display apparatus 12 of the present example, while lines 30 indicate the viewing angle dependence of the contrast of the conventional TN type liquid crystal display apparatus. More specifically, lines 29 and 30 show equi-contrast lines of the respective liquid crystal display apparatuses where a contrast value of 10 is obtained. An evaluation of the viewing angle characteristics of the liquid crystal display apparatus 12 of the present example has indicated the broad viewing angle characteristics of the liquid crystal display apparatus 12, as shown in FIG. 3, such that a contrast value of 10 or more is obtained in a viewing angle range of ±65° or more with respect to all viewing directions. Herein, a "viewing direction" is defined as a direction in which a viewer views the liquid crystal display device 11, the direction being taken on a plane parallel to the liquid crystal display device; a "viewing angle" is defined as an angle at which the viewer views the liquid crystal display device 11, the angle being taken with respect to a normal axis of the glass substrate 16 or 17. On the other hand, the conventional liquid crystal display apparatus has viewing angle characteristics such that, although a contrast value of 10 or more is obtained in a viewing angle range of 50° or more in viewing directions closer to the viewer, the same contrast value of 10 or more can be obtained in an extremely small range of viewing angles in viewing directions farther from the viewer. Moreover, an observation by human eyesight has confirmed that no reversal of black images and white images occurs in the liquid crystal display apparatus 12 even when the driving voltage is reduced, so that the problem of uneven display and coarseness are eliminated.

By using a block copolymer of polystyrene and polyisoprene for the orientation films 20 and 21 and by varying the content ratios thereof, it becomes possible to align the liquid crystal molecules radially with respect to the center of each pixel.

Moreover, it has been confirmed that the effects attained in the above example can also be attained in cases where a block copolymer such as a PS/tetrahydrofuran block copolymer, a graft copolymer such as PP/nylon and PE/nylon, an IPN such as PMMA/PE and PS/PP, or a polymer blend such as a PS/PS-polyisoprene copolymer is used for the orientation films 20 and 21.

An observation by human eyesight has confirmed that the liquid crystal display apparatus can also attain broad viewing angle characteristics when a liquid crystal material to which a chiral dopant is added is injected as the liquid crystal layer 22.

The effects attained in the above example can also be attained when a liquid crystal material, to which a dichroic dye is added, is used as the liquid crystal layer 22.

The effects attained in the above example can also be attained by using the orientation film 20 or 21 as an orientation film on one of the pair of glass substrates 16 and 17 and using a conventional orientation film as an orientation film on the other of the pair of glass substrates 16 and 17.

FIG. 4 is a cross-sectional view showing a liquid crystal display apparatus 12 for describing reasons why the viewing angle characteristics of the liquid crystal display apparatus 12 according to the present invention are improved due to multi-axial orientation of the liquid crystal molecules 33. FIGS. 4A to 4C describe the states of the liquid crystal molecules when an electric field is turned on and off by applying a voltage to the liquid crystal display apparatus 12 by means of a driving circuit 34 and terminating the voltage, in a state where light is incident on the liquid crystal display apparatus 12. As shown in FIG. 4B, when a voltage is applied, the liquid crystal molecules 33 tilt in arbitrary directions (with respect to a normal axis of the glass substrates 16 and 17), so that the apparent refractive index of the liquid crystal layer 22 becomes substantially equal along a direction indicated by arrow α and a direction indicated by arrow β. Thus, the viewing angle characteristics of the liquid crystal display apparatus are improved. In other words, the liquid crystal molecules 33 are multi-axially aligned, as shown in FIG. 4D, so that the liquid crystal molecules 33 stand substantially omni-directionally when a voltage is applied, whereby the viewing angle characteristics of the liquid crystal display apparatus 12 are improved. Furthermore, according to the present example, the coarseness problem of the display has been confirmed to be eliminated.

EXAMPLE 2

Figure 5:
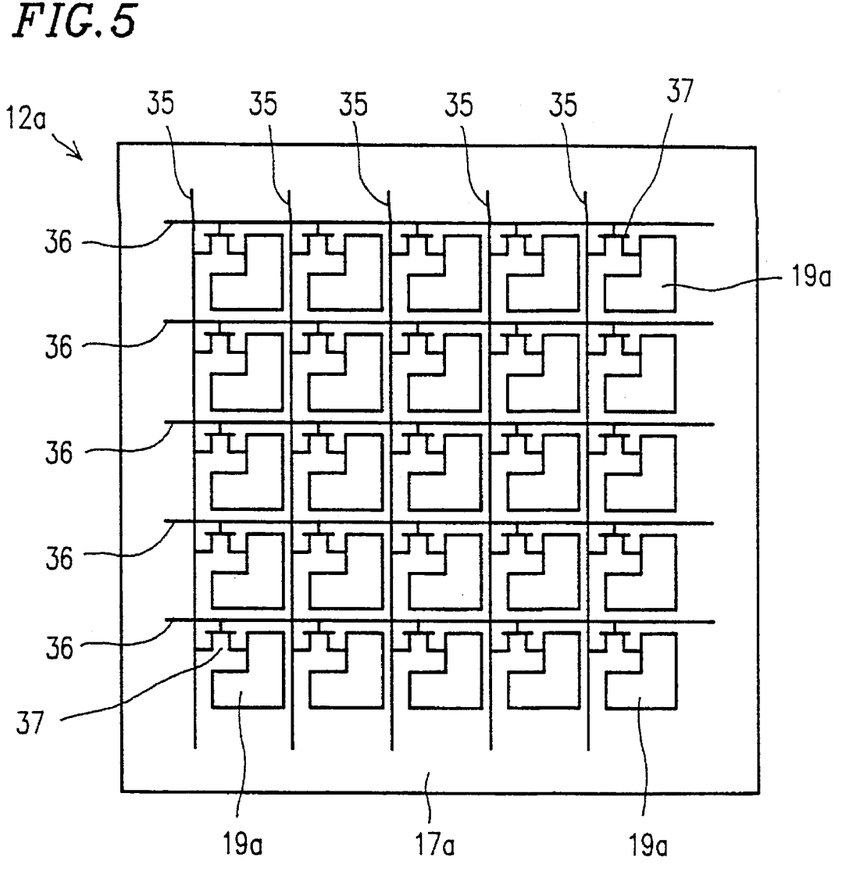
FIG. 5 is a plan view showing an active matrix type liquid crystal display apparatus 12a incorporating a liquid crystal display device 11 according to another example of the present invention.
Figure 6:
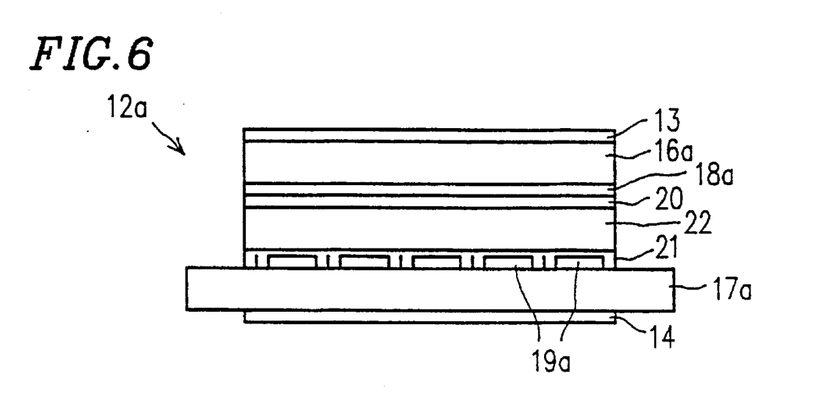
FIG. 6 is a cross-sectional view showing the liquid crystal display device apparatus 12a shown in FIG. 5.

FIG. 5 is a plan view showing a configuration for an active matrix type liquid crystal display apparatus 12a according to Example 2 of the present invention. FIG. 6 is a cross-sectional view showing the liquid crystal display apparatus 12a. The liquid crystal display device 12a includes a first substrate 17a, a second substrate 16a, and a liquid crystal layer 22 interposed between the first substrate 17a and the second substrate 16a. On the first substrate 17a, a switching transistor 37 and a display pixel electrode 19a are formed at each intersection of a plurality of signal lines 35 and a plurality of scanning lines 36. On the second substrate 16a, a counter electrode 18a is formed. As the switch transistors 37, thin film transistors (TFTs) may be formed that comprises a-Si or p-Si, for example. In the liquid crystal display apparatus 12a having the above configuration, orientation films 20 and 21 that are similar to the orientation films 20 and 21 of Example 1 are formed; an interspace similar to that between the substrates 16 and 17 is provided between the substrates 16a and 17a; and a liquid crystal material similar to that used in Example 1 is used, so as to construct the active matrix type liquid crystal display apparatus 12a. The viewing angle characteristics of the active matrix type liquid crystal display apparatus 12a are greatly improved, as in the case of the liquid crystal display apparatus 12.

The present invention, and in particular Example 2, has the following distinctions with respect to the invention of Japanese Laid-Open Patent Publication No. 3-293324 (hereinafter referred to as "the prior art") and attains effects based on such distinctions that cannot be attained by the prior art. In Examples 1 and 2, the orientation films 20 and 21 are formed of a polymer alloy, and the liquid crystal is aligned either bi-axially or multi-axially. As a result, the orientation films 20 and 21 of the present invention have an orientation function that is totally different from that of the prior art, where the liquid crystal is aligned along a certain direction by generally uniformly aligning molecular chains (main chains) of the LB film along a predetermined direction.

Owing to the orientation function of the orientation films 20 and 21 of Examples 1 and 2, the viewing angle dependence of the liquid crystal display device of the present invention along vertical and horizontal directions can be eliminated. As a result, a liquid crystal display device is provided in which contrast changes, coloration phenomena, and reversal phenomena of displayed images (which occur due to the viewing angle dependence of the contrast with respect to the vertical and horizontal directions) are eliminated and which has high contrast and substantially no display unevenness. Such effects are neither taught nor suggested in the prior art.

A stereoregular polymer, which is one of the materials constituting the liquid crystal orientation film of the prior art, is a polymer having regularity with respect to its three-dimensional structure on the atom level. On the other hand, in accordance with the polymer alloy constituting the orientation films of Examples 1 and 2, a structure composed of congregations of molecular chains is provided, the molecular congregations having three-dimensional regularity as a whole. Therefore, the present invention is also structurally distinct from the prior art in this respect. According to the present invention, a polymer alloy that has three-dimensional regularity on the molecular congregation level is used, thereby aligning the liquid crystal molecules either bi-axially or multi-axially; this effect is not obtained by the prior art.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a pair of substrates opposing each other, a plurality of display pixel electrodes being provided in a matrix shape on one of the pair of substrates;

a liquid crystal layer interposed between the pair of substrates; and an orientation layer for controlling an orientation state of liquid crystal molecules in the liquid crystal layer, the orientation layer being formed on a surface of at least one of the substrates that opposes the liquid crystal layer and in contact with said liquid crystal layer, wherein the orientation layer is composed essentially of a polymer alloy.

2. A liquid crystal display device according to claim 1, wherein the polymer alloy has a phase separation structure, and wherein a portion in which the liquid crystal molecules are controlled so as to have at least one orientation state of a linear orientation, a radial orientation, a bi-axial orientation, and a multi-axial orientation is formed corresponding to each of the plurality of display device pixels.

3. A liquid crystal display device according to claim 1, wherein the orientation layer is an organic film having a macro-phase separation structure of an incompatible polymer blend.

4. A liquid crystal display device according to claim 1, wherein the orientation layer is an organic film having a micro-phase separation structure of a block copolymer comprising an incompatible block chain.

5. A liquid crystal display device according to claim 1, wherein the orientation layer is an organic film having a micro-phase separation structure of a graft copolymer grafted by an incompatible monomer.

6. A liquid crystal display device according to claim 1, wherein the orientation layer is an organic film having a micro-phase separation structure of an interpenetrating polymer network comprising a polymer pair of an an incompatible polymer pair.

7. A liquid crystal display device according to claim 2, wherein the phase separation structure has a size in the range of 10 nm to 200 μm.

8. A liquid crystal display device according to claim 3, wherein the macro-phase separation structure has a size in the range of 500 nm to 200 μm.

9. A liquid crystal display device according to claim 4, wherein the micro-phase separation structure has a size in the range of 10 nm to 1 μm.

10. A liquid crystal display device according to claim 1, wherein the polymer alloy is selected from the group consisting of: a polyamide (PA) alloy; a polyimide (PI) alloy; a polyolefin (PO) alloy; a polystyrene (PS) alloy; a polyethyleneterephthalate (PET) alloy; a polyvinyl chloride (PVC) alloy; a polymethyl methacrylate (PMMA) alloy; a polyacetal alloy; a polycarbonate (PC) alloy; a polyphenylene ether (PPE) alloy; a polyphenylene sulfide (PPS) alloy; a polyarylene etherketone (PAEK) alloy; and an amorphous polyarlylate (PAr) alloy.

11. A liquid crystal display device according to claim 1, wherein the liquid crystal layer comprises a nematic liquid crystal material comprising no chiral dopant.

12. A liquid crystal display device according to claim 1, wherein the liquid crystal layer comprises a nematic liquid crystal to which a chiral dopant is added.

13. A liquid crystal display device according to claim 1, wherein the liquid crystal layer comprises a dichroic dye.

14. A liquid crystal display device according to claim 1, wherein active switching elements are formed on one of the pair of substrates, the switching elements being actively driven.

* * * * *